(12) United States Patent
Li et al.

(10) Patent No.: US 8,326,252 B2
(45) Date of Patent: Dec. 4, 2012

(54) CONTROLLABLE IMAGE CANCELLATION IN A RADIO RECEIVER

(75) Inventors: Junsong Li, Austin, TX (US); John Khoury, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 977 days.

(21) Appl. No.: 12/317,786

(22) Filed: Dec. 30, 2008

(65) Prior Publication Data

US 2010/0167680 A1 Jul. 1, 2010

(51) Int. Cl.
*H04B 1/10* (2006.01)

(52) U.S. Cl. ........................... 455/302; 455/323

(58) Field of Classification Search .................. 455/296, 455/302, 303, 304, 305, 307, 310, 325, 317, 455/318, 323; 375/344, 349, 350

See application file for complete search history.

(56) References Cited

U.S. PATENT DOCUMENTS

| | | | |
|---|---|---|---|
| 4,345,241 A | 8/1982 | Takeuchi et al. | |
| 6,744,829 B1 | 6/2004 | Mohindra | |
| 6,959,016 B1 | 10/2005 | Keeth et al. | |
| 7,158,586 B2 | 1/2007 | Husted | |
| 2005/0135521 A1 | 6/2005 | Nemer et al. | |
| 2005/0243949 A1 | 11/2005 | Khoini-Poorfard | |
| 2008/0096513 A1* | 4/2008 | Lim et al. ..................... 455/302 |
| 2010/0330947 A1* | 12/2010 | Khoury et al. ............... 455/302 |
| 2011/0189970 A1* | 8/2011 | Ohshiro ........................ 455/302 |

OTHER PUBLICATIONS

Keng Leong Fong, et al., "High-Frequency Nonlinearity Analysis of Common-Emitter and Differential-Pair Transconductance Stages," IEEE Journal of Solid State Circuits, vol. 33, No. 4, pp. 548-555. Apr. 1998.

Keng Leong Fong, et al., "A Class AB Monolithic Mixer for 900 MHz Applications," IEEE Journal of Solid-State Circuits, pp. 1166-1172, Aug. 1997.

Keng Leong Fong, et al., "2.4 Monolithic Mixer for Wireless LAN Applications," IEEE Custom Integrated Circuits Conference, pp. 9.4.1-9.4.4, May 1997.

Stefaan Van Gerven, et al., "Signal Separation by Symmetric Adaptive Decorrelation: Stability, Convergence, and Uniqueness," IEEE Transactions on Signal Processing, vol. 43, No. 7, Jul. 1995, pp. 1602-1612.

Fred Harris, "Digital Filter Equalization of Analog Gain and Phase Mismatch in I-Q Receivers," 1996, pp. 793-796.

(Continued)

*Primary Examiner* — Thanh Le
(74) *Attorney, Agent, or Firm* — Trop, Pruner & Hu, P.C.

(57) ABSTRACT

In one embodiment, a receiver includes parallel paths for signal channel processing and image channel processing. The paths may include a mixer to receive an intermediate frequency (IF) signal and to downconvert the IF signal to a channel baseband signal, a filter to generate a filtered channel value, a combiner to combine the channel baseband signal with a filtered channel value from the other path to obtain a channel path output, in addition to one or more controllers to generate a step control signal and update a weighting of the filters based at least in part on the step control signal.

15 Claims, 9 Drawing Sheets

OTHER PUBLICATIONS

Stefaan Van Gerven, et al., "On the Use of Decorrelation in Scalar Signal Separation," IEEE, 1994, pp. 57-60.

Mikko Valkama, et al., "Advanced Methods for I/Q Imbalance Compensation in Communication Receivers," IEEE Transactions on Signal Processing, vol. 49, No. 10, Oct. 2001, pp. 2335-2344.

Supisa Lerstaveesin, et al., "A Complex Image Rejection Circuit With Sign Detection Only," IEEE Journal of Solid-State Circuits, vol. 41, No. 12, Dec. 2006, pp. 2693-2702.

U.S. Appl. No. 12/493,738, filed Jun. 29, 2009, entitled "Providing Image Rejection Calibration for a Receiver," by John Khoury, et al.

\* cited by examiner

CONTROLLABLE IMAGE CANCELLATION IN A RADIO RECEIVER

BACKGROUND

Many radio receivers include an in-phase/quadrature (I/Q) demodulation architecture, in which a received modulated carrier signal is simultaneously applied to an I-channel mixer and a Q-channel mixer. A local oscillator (LO) is also applied to the mixers to effect frequency conversion from a radio frequency (RF) at which the radio signal is received to an intermediate frequency (IF). In an I/Q demodulator, the LO signal that is applied to this Q-channel mixer is offset by 90° from the LO signal that is applied to the I-channel mixer.

Image rejection is one metric by which receiver system performance may be evaluated. In general, image rejection refers to the ability of the receiver to reject responses resulting from RF signals at a frequency offset from the desired RF carrier frequency by an amount equal to twice the IF of a dual-conversion receiver. For example, if the desired RF signal is at 100 megahertz (MHz), and the receiver IF is 10.7 MHz, then the receiver LO will be tuned to 89.3 MHz. However, as is well known to those skilled in the art, the receiver will also exhibit a response to undesired RF signals (i.e., image signals) at a frequency 10.7 MHz below the LO frequency, in this case, 78.6 MHz. The receiver's response to the 78.6 MHz signal is referred to as the image response, because the image signal resides at a frequency opposite the LO frequency from the desired RF carrier, and offset from the LO frequency by the magnitude of the IF.

In a typical low IF radio receiver architecture, mis-match between in-phase and quadrature phase paths cause image interference cross-talk. In many receivers, one or more strong adjacent channels may become the image interference and make reception un-acceptable.

SUMMARY OF THE INVENTION

One aspect of the present invention is directed to a receiver that includes parallel paths for signal channel processing and image channel processing. The paths may include a mixer to receive an intermediate frequency (IF) signal and to down-convert the IF signal to a channel baseband signal, a filter to generate a filtered channel value, a combiner to combine the channel baseband signal with a filtered channel value from the other path to obtain a channel path output. The receiver may further include one or more controllers to determine signal strengths of the channel baseband signals and generate a step control signal based at least in part thereon, and to receive the channel path outputs and to update a weighting of the filters based on the channel path outputs and the step control signal.

Yet another aspect of the present invention is directed to a method for calculating signal strengths of pre-filtered image and desired channel signals obtained in a receiver, and determining whether the signal strength of the pre-filtered image channel signal is greater than the signal strength of the pre-filtered desired channel signal by at least a threshold level, and if so enabling image cancellation processing, otherwise disabling the image cancellation processing. When enabled, a step control signal for a filter update mechanism may be controlled to have different levels depending on whether the receiver is in an acquisition or tracking mode.

A still further aspect of the present invention is directed to a system including an antenna to receive a radio frequency (RF) signal, an analog front end to receive the RF signal from the antenna and to downconvert it to a digital complex signal. The system further may include a digital front end having an image canceller to perform image rejection and which may include parallel image and channel paths. Still further the system may include one or more controllers to generate a step control signal based at least in part on signal strengths of image and channel signals, and to update a weighting of path filters based on channel path outputs and the step control signal. Still further, the system may include a digital signal processor coupled to the digital front end to receive and demodulate a signal channel path output.

DETAILED DESCRIPTION

Embodiments may be implemented in various receivers including different types of RF receivers. As one example, a multi-mode receiver, which may be a standalone receiver or part of a combined transmitter and receiver (i.e., transceiver) may be configured to handle receipt and processing of different radio bands. For example, a broadcast receiver may be configured to handle frequency modulation (FM), AM and weather band (WB), including both analog FM as well as high definition (HD) FM. In one such implementation, the receiver may be a low-intermediate frequency (IF) receiver. As such, issues with regard to image rejection may be considered.

Embodiments may provide a unified solution to radio receiver image rejection problems, such as present in low-IF FM/AM/WB receivers. Separate data paths are provided for: (1) processing actual received data that then is provided for downstream demodulation; and (2) processing an image signal for use in an image canceller filter updating path. In some implementations, a cost-effective infinite impulse response (IIR) low pass filter (LPF) can be used for updating of the filter, which can be used to filter out potential strong adjacent channel interference. Many embodiments can be implemented in a purely digital system, without any analog circuit modification or training signals. Further, some embodiments may provide a programmable decimator so that for different sampling rates, an image canceller core remains the same, providing an effective solution for FM+HD, FM, AM and weather band operation, as will be described below. To monitor the operation of the image canceller, signal strength information of both the desired signal and image channels (pre and post image cancellation) can be calculated for tap updating and step size control.

Figure 1:
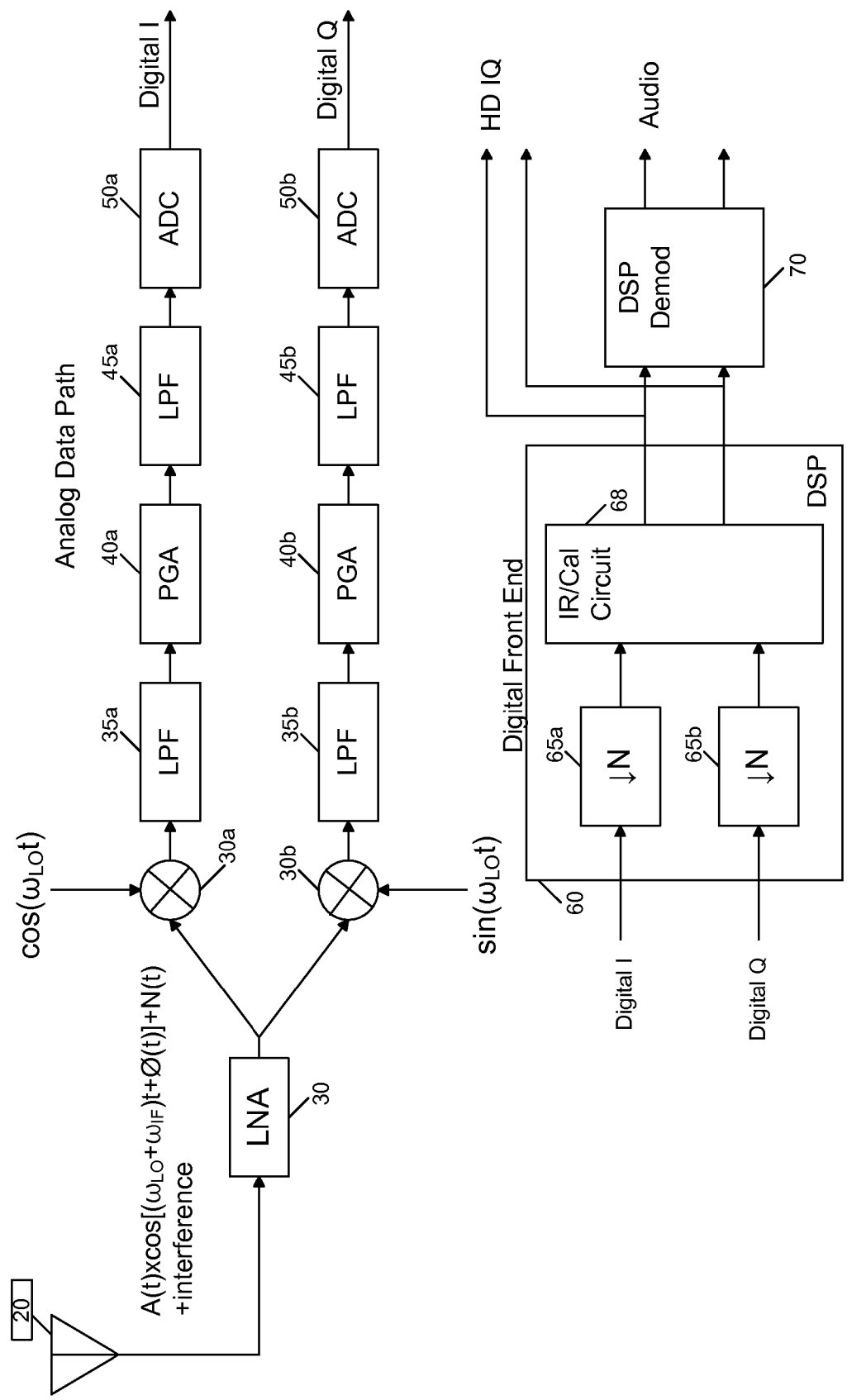
FIG. 1 is a block diagram of a receiver in accordance with one embodiment of the present invention.

Referring now to FIG. 1, shown is a block diagram of a receiver in accordance with one embodiment of the present invention. As shown in FIG. 1, receiver 10 may be of a low-IF receiver architecture. In the embodiment of FIG. 1, receiver 10 is coupled to receive an RF signal via an antenna 20 that in turn is coupled to a low noise amplifier (LNA) 30. In turn, the RF signal may be provided to mixers 30a and 30b. As seen in FIG. 1, the receiver may have a complex signal architecture having separate in-phase (I-phase) and quadrature (Q-phase) phases, such that separate paths for I and Q-phases are provided. This is realized by mixers 30, each of which mix the received RF signal with a local oscillator (LO) frequency at different phases, namely 90° apart. In the embodiment of FIG. 1, mixers 30 may mix the incoming signal with a local oscillator frequency to generate an IF signal. In various implementations, this IF signal may be between approximately 120 and 250 kilohertz (kHz). For example, in one embodiment, for FM/AM/WB the IF signal can be fixed at 120 kHz, while for HD it can be fixed at 250 kHz, although the scope of the present invention is not limited in this regard.

Various analog processing may then be performed on the IF signals. Specifically, each of the I and Q paths may include a first low pass filter (LPF) 35, a programmable gain amplifier (PGA) 40 and a second LPF 45. The resulting signal is then provided to an analog-to-digital converter (ADC) 50, which converts the analog IF signals to digital I and Q signals, which may then be provided to a digital portion of the receiver. Note that while in many implementations receiver 10 may be configured as a single integrated circuit, e.g., a complementary metal oxide semiconductor (CMOS) device configured on a single semiconductor die, the scope of the present invention is not limited in this regard.

The digital information may be provided to a digital portion of the receiver which may include a digital front end 60 that may perform various digital processing to prepare the signals for demodulation in a digital signal processor (DSP) 70, which may thus demodulate the signals and provide demodulated data to a desired location. As seen in FIG. 1, digital front end 60 may include programmable decimators 65 to control a sampling rate of the digital signals. Note that the programmable decimation ratio N can be controlled to handle various sampling rates, e.g., HD (744 kilosamples per second (KS/s)), FM (372 KS/s), WBRX (93 KS/s), AM (46 KS/s).

While shown as a single structure, understand that in some implementations a portion of such decimation may be performed in fixed digital hardware, while additional decimation may be performed using programmable logic. In addition, front end 60 may further include an image rejection/calibration circuit 68 to handle image rejection processing and to generate samples at a desired rate, e.g., according to a direct digital frequency synthesizer (DDFS) operation to thus provide digital samples to DSP 70. While shown with this particular implementation in the embodiment of FIG. 1, the scope of the present invention is not limited in this regard.

Figure 2:
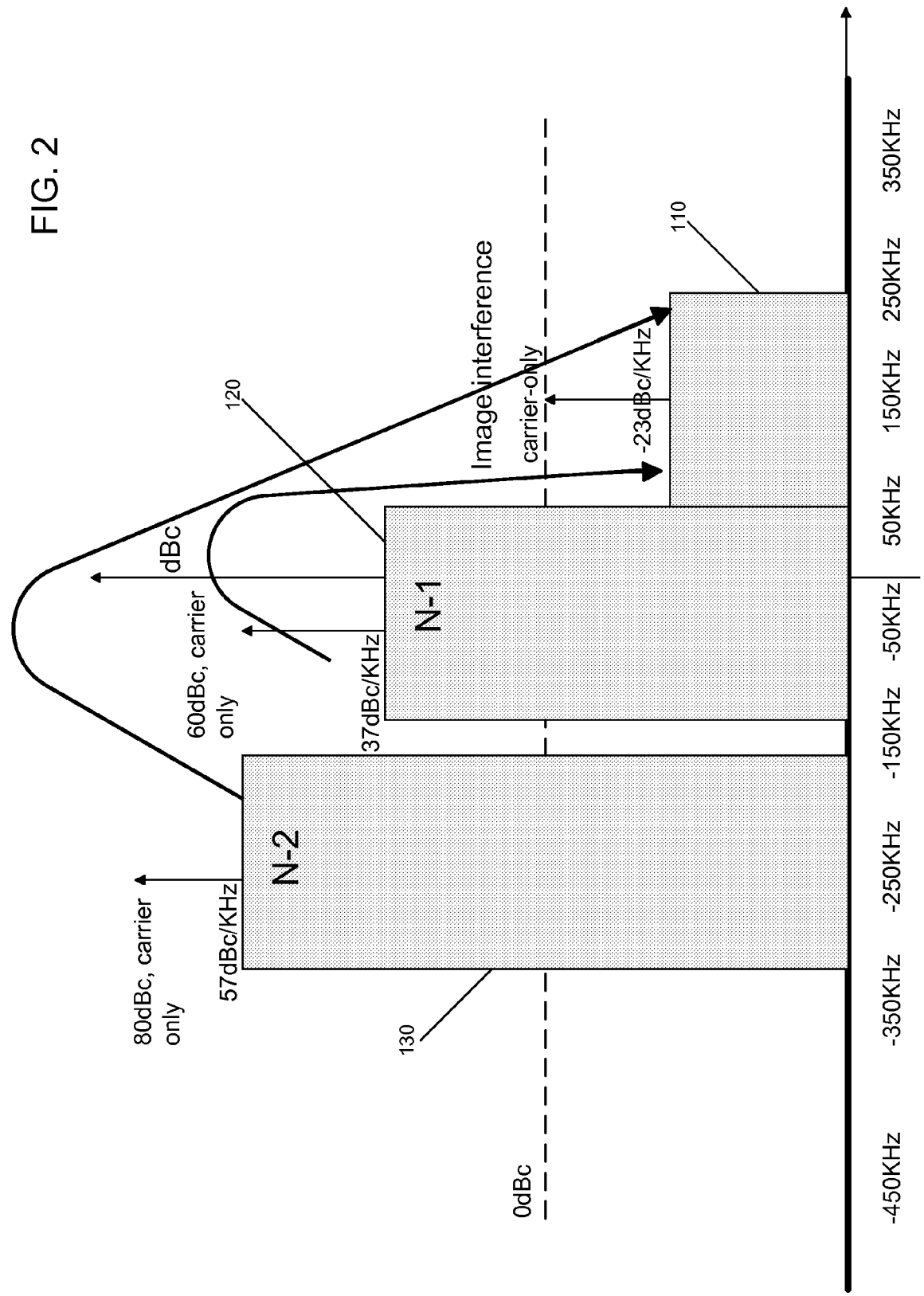
FIG. 2 is a block diagram of a frequency spectrum of an FM signal band.

To better understand the image rejection processing performed in various embodiments, it is instructive to consider the sources of such image information. Referring now to FIG. 2, shown is a block diagram of a frequency spectrum of an FM signal band in which an FM channel 110 (which may be a desired FM channel) is close to several blocking or interfering channels 120 and 130. Note that the spectrum shown in FIG. 2 is after downconversion and thus is at the selected intermediate frequency. As seen in FIG. 2, desired FM channel 110 is of relatively minimal signal strength, whereas blocking channels 120 and 130 are of much greater signal strength. Due to image rejection issues, some amounts of interference or noise from these two image blocking channels bleed into desired channel 110.

The image rejection ratio (IRR) is defined as $$\frac{P_{Desired}}{P_{image}},$$

where P=power. This may correspond to:

$$\frac{|1 + \beta \times e^{-j\Theta}|^2}{|1 - \beta \times e^{j\Theta}|^2} \quad [\text{EQ. 1}]$$

$$= \frac{1 + \beta^2 + 2\beta\cos\Theta}{1 + \beta^2 - 2\beta\cos\Theta} \quad [\text{EQ. 2}]$$

Where β is a ratio of I path magnitude to Q path magnitude at a given frequency.

If the IQ mismatch value between the paths is frequency dependent, then IRR is also frequency dependent:

$$IRR(f) = \frac{1 + \beta(f)^2 + 2\beta(f)\cos(\Theta(f))}{1 + \beta(f)^2 - 2\beta(f)\cos(\Theta(f))} \quad [\text{EQ. 3}]$$

As a result, the on-channel mean IRR can be defined as:

$$\overline{IRR} = \frac{\int_{BW}[1 + \beta(f)^2 + 2\beta(f)\cos(\Theta(f))]\,df}{\int_{BW}[1 + \beta(f)^2 - 2\beta(f)\cos(\Theta(f))]\,df} \quad [\text{EQ. 4}]$$

where BW equals bandwidth.

Specifically, assume in FIG. 2 a receiver having an IRR of 60 db. The desired FM channel 110 has a signal-to-interference (S/I) ratio of approximately −20 dB, while blocking channel 130 has a power of +80 dBc. Even with an IRR a 70 dB, the desired channel still would have a S/I~−10 db. Note that the low IF may be placed as low as allowed to avoid the (N−2) blocker (channel 130). At an IRR of 60 dB a S/I~0 dB is realized for a +60 dBc (N−1) blocker (channel 120) alone. If IRR=70 dB, the S/I=10 dB for the desired channel, in the presence of this blocker.

Figure 3:
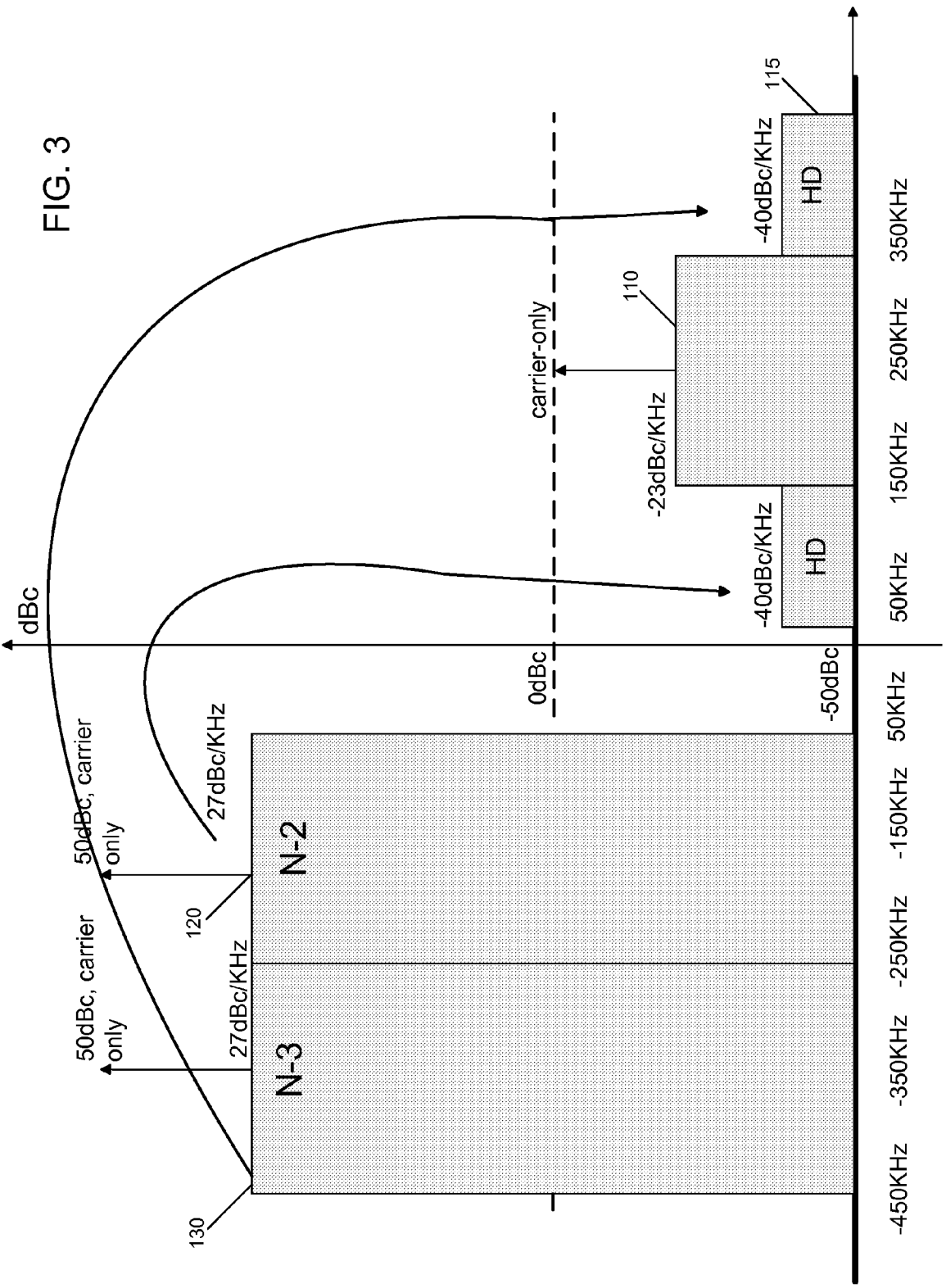
FIG. 3 is a similar frequency spectrum of an FM signal band.

As another example, referring now to FIG. 3, shown is a similar frequency spectrum, however in the embodiment of FIG. 3, the desired channel 110 is in a hybrid mode in which the desired FM channel 110 includes high definition content in side bands 115. As seen, blocking channels 120 and 130 still cause interference into the side bands 115. In this example, assuming an IRR=60 dB analog only, desired FM channel 110 has a S/I=10 dB for +50 dBc blockers 120 and 130 and similarly, at an IRR=77 dB the desired HD has a S/I=10 dB.

Figure 4:
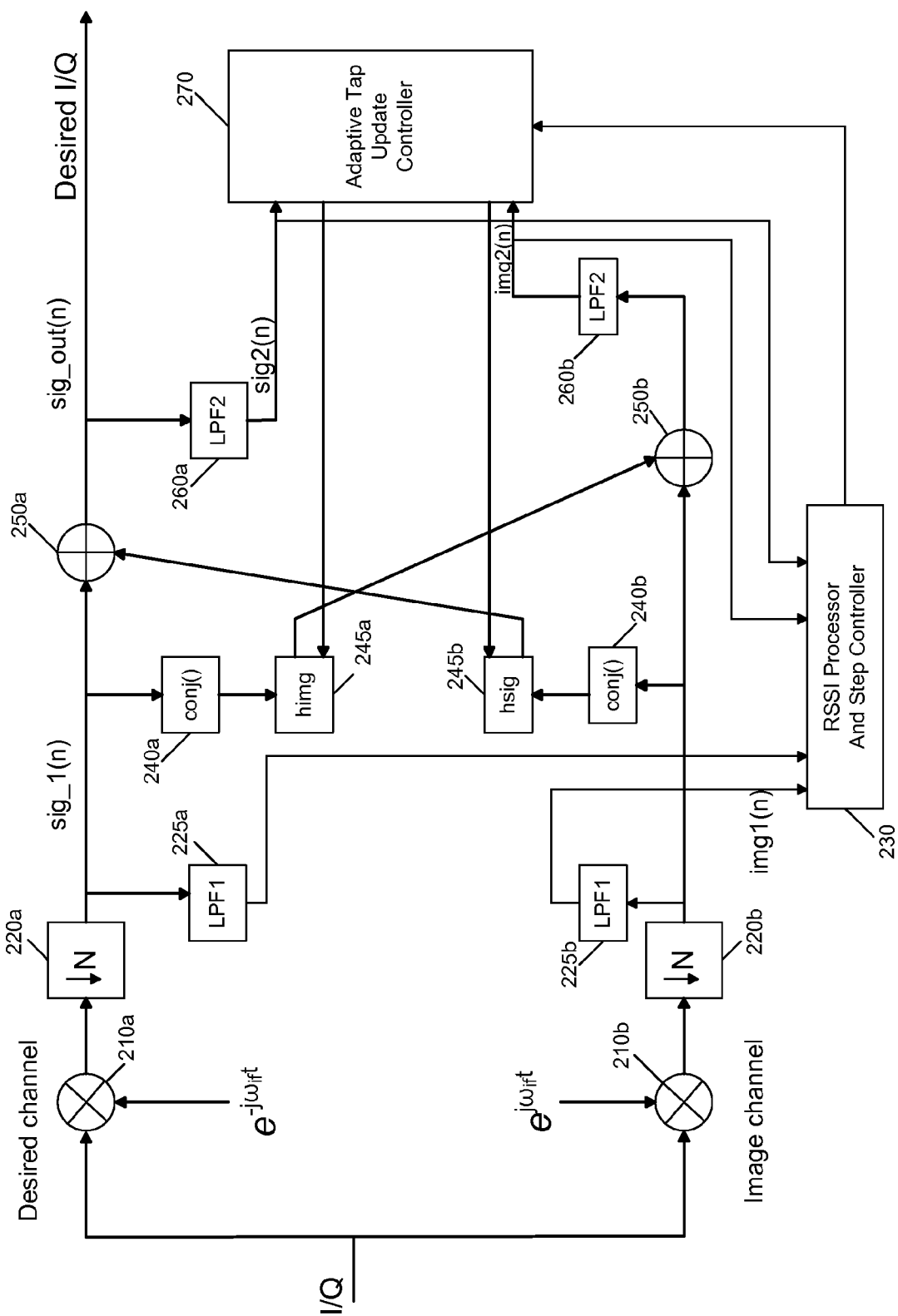
FIG. 4 is a block diagram of an image canceller in accordance with one embodiment of the present invention.

Referring now to FIG. 4, shown is a block diagram of an image canceller in accordance with one embodiment of the present invention. Image canceller 200 may be part of a digital front end of a low-IF receiver, such as shown in FIG. 1. As such, embodiments may include an article in the form of a computer-readable medium onto which instructions are written. These instructions may enable a digital front end DSP or other programmable processor to perform the image cancellation and other processing in accordance with an embodiment of the present invention.

As seen in FIG. 4, incoming digital I and Q signals, which may be at least partially decimated to a selected sampling rate, may be provided to mixers 210, which may be a digital mixer. As seen, mixer $210_a$ mixes the incoming digital I and Q data (i.e., complex data) with an intermediate frequency mixing signal $e^{-j\omega(IF)T}$ to obtain a baseband output, namely baseband signals for the desired channel. Similarly, image signals may be generated using digital mixer $210_b$ which mixes the incoming signals with an opposite polarity IF mixing signal, namely $e^{j\omega(IF)T}$. In turn, the baseband I and Q data may be provided to programmable decimators 220, which output signals at the desired sample rate, which may vary depending on the type of band of operation selected, e.g., FM, FM+HD, AM or WB.

While for ease of discussion the desired channel signal path at the top of FIG. 4 will be discussed, understand that similar components are present in the image channel path, and in which similar processing may occur. As seen in FIG. 4, a first low pass filter 225a may receive and filter the desired channel signal (sig1(n)). This information may be provided to a received signal strength indicator (RSSI) processor and step controller 230, which may be used to determine a signal strength level of the desired channel signal, as discussed below. In addition, the desired channel baseband signal may be provided to a complex conjugate function 240 that generates complex conjugate values that in turn are provided to a digital filter (Himg) $245_a$, which may be under control of adaptive tap update controller 270, as further discussed below. The complex conjugate function may act to generate a negative of the imaginary part of a complex signal, in other words a complex number $ae^{j\Theta}$ may be transformed into $ae^{-j\Theta}$. The filter output for the desired channel may in turn be provided to a combiner $250_b$ of the image channel path.

Similar operations are performed in the image channel path such that a filter output (of image filter $245_b$) for the image channel is provided to combiner $250_a$ of the signal path. The output of combiner $250_a$ thus corresponds to the desired channel signal with the image interference filtered therefrom. This output signal, sig_out(n), may thus pass as the desired IQ data to other portions of the receiver, e.g., a digital demodulator such as may be implemented in a DSP.

As further seen in FIG. 4, an additional input to adaptive tap update controller 270 may be a filtered version of this output signal, as filtered by a second low pass filter 260. In one embodiment, second LPF 260 can be implemented as an infinite impulse response (IIR) LPF to save instruction processing (i.e., provide protection against strong adjacent channel interference, e.g., a 65 dBc first adjacent channel in FM mode).

Details of operation of controller 230 and controller 270 are discussed further below with regard to FIGS. 5 and 6, which are flow charts for the operation of these controllers. While shown with this particular implementation in the embodiment of FIG. 4, understand the scope of the present invention is not limited in this regard.

Figure 5:
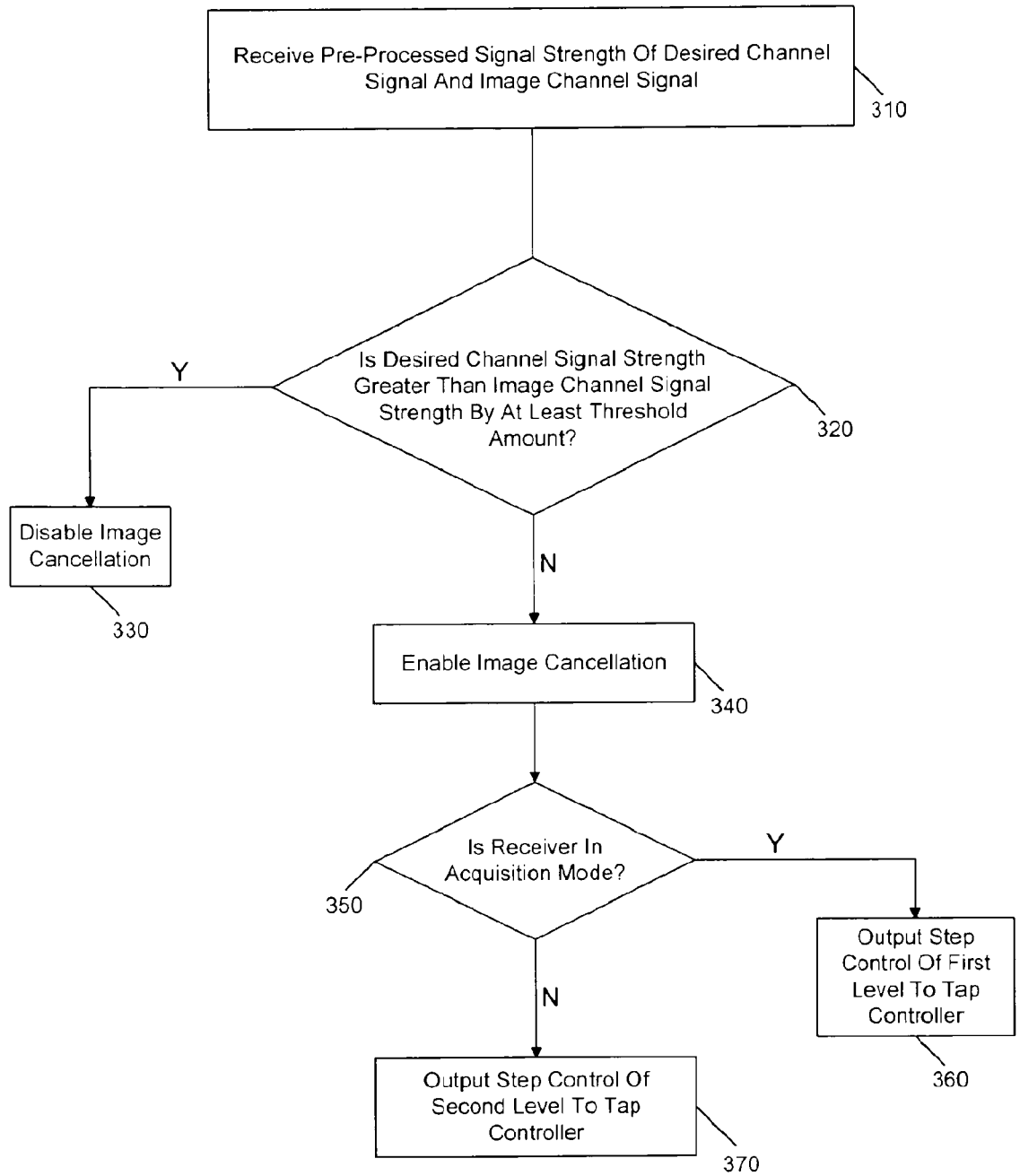
FIG. 5 is a flow diagram of a method in accordance with one embodiment of the present invention.

Referring now to FIG. 5, shown is a flow diagram of a method in accordance with one embodiment of the present invention. As shown in FIG. 5, method 300 may be implemented by a controller, such as an RSSI controller, which can be used to determine whether image cancellation is needed, and if so whether the operation mode of the receiver is an acquisition or tracking mode. These different modes relate to signal acquisition and tracking, and may be used to generate different step control signals for an adaptive tap updating process, as discussed further below.

As shown in FIG. 5, method 300 may begin by receiving signal strength information from the desired signal channel path and the image channel path. More specifically, the signal strength obtained may be for the pre-processed signals, as obtained via LPFs $225_a$ and $225_b$. Of course, additional processing on these filtered signals may be performed to obtain signal strength such as obtaining magnitude information from the filter output and performing an RMS calculation to obtain power levels for the signal channel and the image channel signals. Then it may be determined whether the image channel's signal strength is greater than the desired channel's signal strength (diamond 320). More specifically, a comparison may be done to determine whether the image channel signal strength is greater than the desired channel signal strength by at least a threshold amount. While the scope of the present invention is not limited in this regard, in some implementations this threshold amount may be between approximately 20 dB and 30 dB. If the difference results in a value less than this threshold, image cancellation processing can be disabled (block 330). In this way, the computation expense of running the digital image canceller can be avoided. For the example of FIG. 4, the components of the image channel path and controller 270 may be disabled.

Otherwise, if the difference is above this threshold amount, control passes to block 340, where image cancellation may be enabled. Thus the processing described above implemented in connection with the image canceller of FIG. 4 may be performed. As part of such image processing, the RSSI controller may then determine whether a receiver is in an acquisition mode (diamond 350). The determination of acquisition mode may be based on a difference (i.e., delta) between the signal strength differences determined pre-processing (as discussed above in block 310) and the difference between post-processed signal strengths (as performed in the adaptive tap updating controller). Thus, based on a delta or difference between the difference between the pre-processed signal and image strengths and the difference between the post-processed signal and image signal strengths, the mode may be determined. If this delta moves below a threshold level, then the mode moves from acquisition to tracking. In general, a receiver may be in acquisition mode when this delta is less than a threshold level of approximately 5~10 dB. As such, the shift from acquisition mode to tracking mode may be determined using pre/post signal/image channel RSSIs. Such values can be monitored for taps convergence and upon such, the updating step size of blocks 360 and 370 may be shifted from large steps to small steps.

More specifically, depending on whether it is determined that the receiver is an acquisition or tracking mode, control passes to one of blocks 360 and 370. Specifically, for acquisition mode a step control signal of a first level may be sent to the tap controller, while a step control signal of a second level may be sent during tracking mode. While the scope of the present invention is not limited in this regard, the first level for the step control signal may correspond to ⅛ and the second level may correspond to 1/64, although in other embodiments these values may be dynamic variables. While shown with this particular implementation in the embodiment of FIG. 5, understand that a RSSI controller may operate differently in other embodiments.

Figure 6:
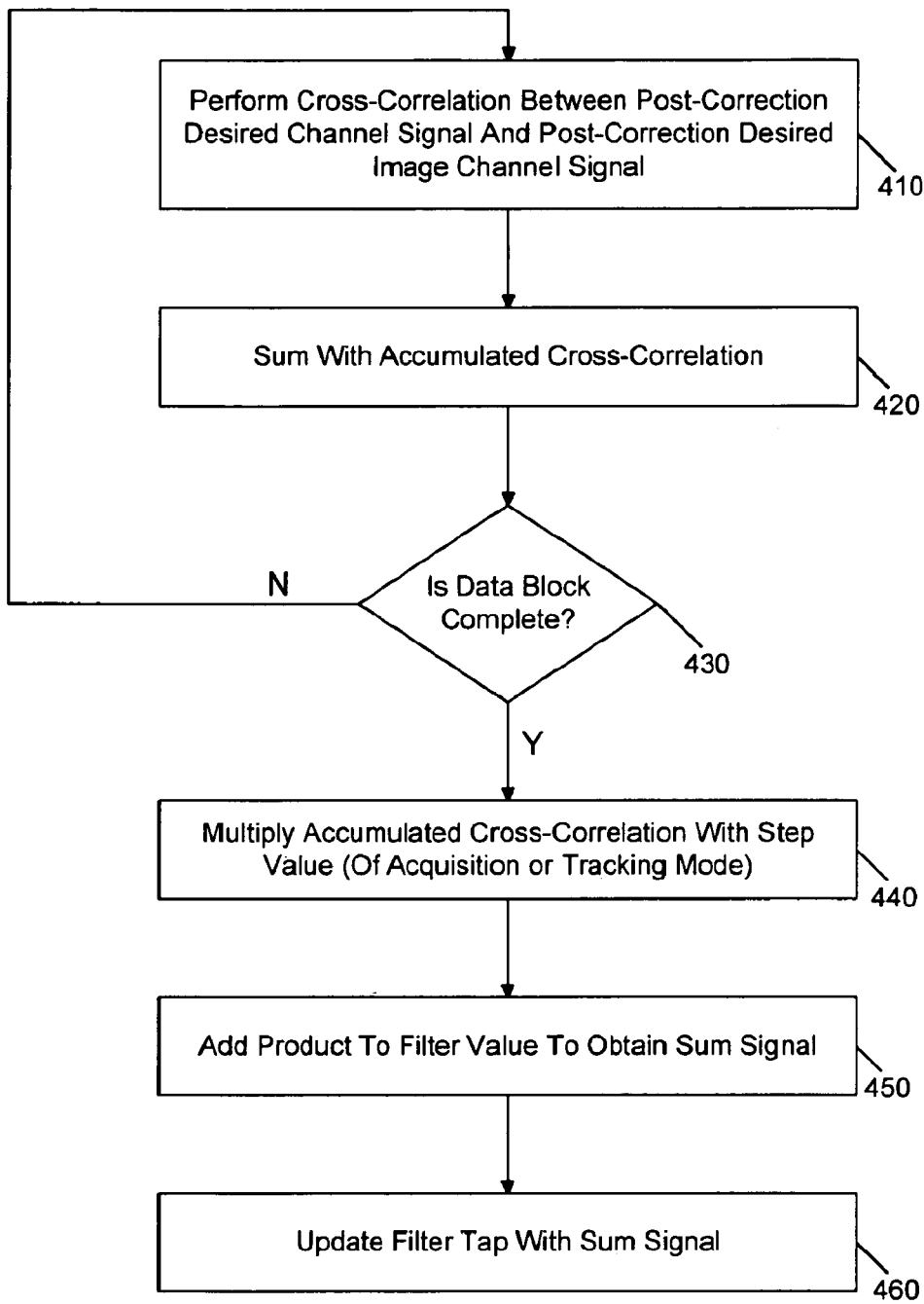
FIG. 6 is a flow diagram of a method of performing adaptive tap updating in accordance with an embodiment of the present invention.

Referring now to FIG. 6, shown is a flow diagram of a method of performing adaptive tap updating in accordance with an embodiment of the present invention. As shown in FIG. 6, method 400 may begin by performing a cross-correlation between the post-correction desired signal channel and image signal channel (block 410). The result of this cross-correlation may be summed with an accumulated cross-correlation (block 420). Such steps may be performed for a given length of a data block. Thus if it is determined at diamond 430 that the data block is not completed, the cross-correlation and accumulation will continue. In one embodiment, such operations may be performed in accordance with the algorithm portion A shown in Table 1, where the resulting accumulated cross-correlation corresponds to mean_diff_h(img or sig), which may be a mean value that is obtained by averaging the accumulation by the number of samples.

Note that while the cross-correlation may be performed for each sample of a data block, in some implementations improved processing may be realized by reducing the number of samples on which the cross-correlation is performed. For example, assume a 64 data sample block, some implementations may only perform cross-correlation on a reduced number of these samples, e.g., 8 or 16, and then the accumulated result may be averaged accordingly to obtain a mean value. In this way, the amount of processing to be performed can be reduced.

TABLE 1

|   |   |
|---|---|
|   | for m = 1:BLOCK |
|   |   for im = 1:Num_Itap |
|   |     mean_diff_hsig(im) = |
| A |       mean_diff_hsig(im) + |
|   |       sig2(m) * img2(m−im+1); |
|   |     mean_diff_himg(im) = |
|   |       mean_diff_himg(im) + sig2(m−im+1) * img2(m); |
|   |   end |
|   | end |
|   | for im = 1:Num_Itap |
|   |   if(IRCAL_ACQ == 0) |
|   |     %tracking mode |
|   |     hsig(im) = hsig(im) + step_1 * (mean_diff_hsig(im)); |
|   |     himg(im) = himg(im) + step_1 * |
|   |       (mean_diff_himg(im)); |
| B |   else |
|   |     %acquisition mode |
|   |     hsig(im) = hsig(im) + step_2 * (mean_diff_hsig(im)); |
|   |     himg(im) = himg(im) + step_2 * |
|   |       (mean_diff_himg(im)); |
|   |   end |
|   |   mean_diff_hsig(im) = 0; |
|   |   mean_diff_himg(im) = 0; |
|   | end |

At the conclusion of a data block, the accumulated cross-correlation may be multiplied with a step value (block 440). The step values (step_1 and step_2) may correspond to the step control signal provided by the RSSI controller. As discussed above, different values for this step control signal may be generated depending upon whether operation is in acquisition mode or tracking mode. Then, the product obtained may be added to a filter value to obtain a sum signal (block 450). In one embodiment, these operations may be performed in accordance with the algorithm portion B shown in Table 1. This sum signal may then be used to update the filter tap (block 460). Note that the implementation shown in FIG. 6 is for adaptively updating a single tap of a filter. In various embodiments, the digital filter may be a multi-tap filter and as such, the operations of FIG. 6 may be performed for each tap of the filter.

Figure 7:
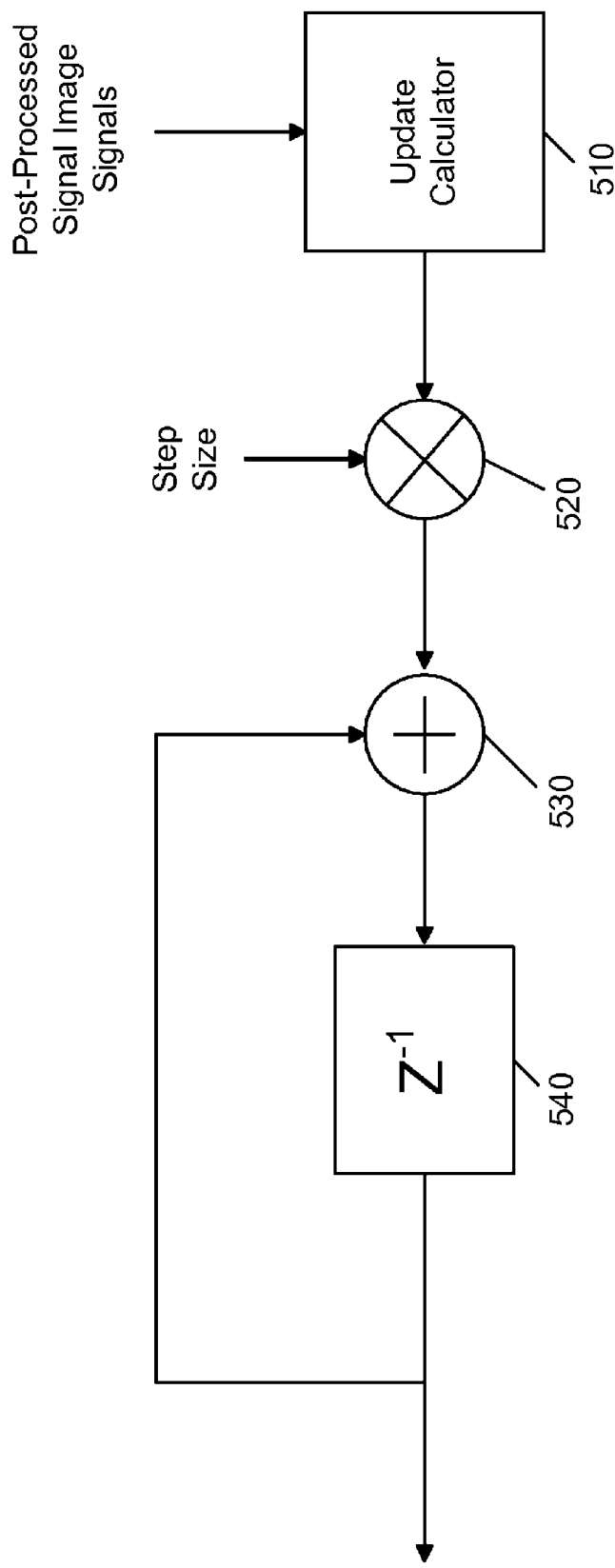
FIG. 7 is a block diagram of an adaptive update controller in accordance with one embodiment of the present invention.

A block diagram representing the operations performed by the adaptive update controller is shown in FIG. 7. As shown in FIG. 7, control circuitry 500 may be used to perform the adaptive tap updating. As seen, an update calculator 510 may be coupled to receive post-processed signal and image channel information. As described above, this information may be post-processed signal strength information regarding the signal channel and the image channel, which may be obtained via LPFs 260$_a$ and 260$_b$, the outputs of which can be transformed into RMS values. Update calculator 510 may perform the cross-correlation, as well as the accumulation to then obtain a mean cross-correlation. This accumulated cross-correlation may then be provided to a multiplier 520, which multiplies this value by the step size, namely the step control signal provided by the RSSI controller. This product is then provided to a combiner 530, which adds the product to the value stored in a delay element 540 associated with a tap of the filter. As seen, it is the feedback of the value stored in delay element 540 that is summed with the product from multiplier 520 to obtain the update value. This update value is then used to update the given tap of the filter. Note, however that while shown with this general representation in the embodiment of FIG. 7, the update value is actually provided to a coefficient element of the filter and not to delay element 540 of FIG. 7.

Figure 8:
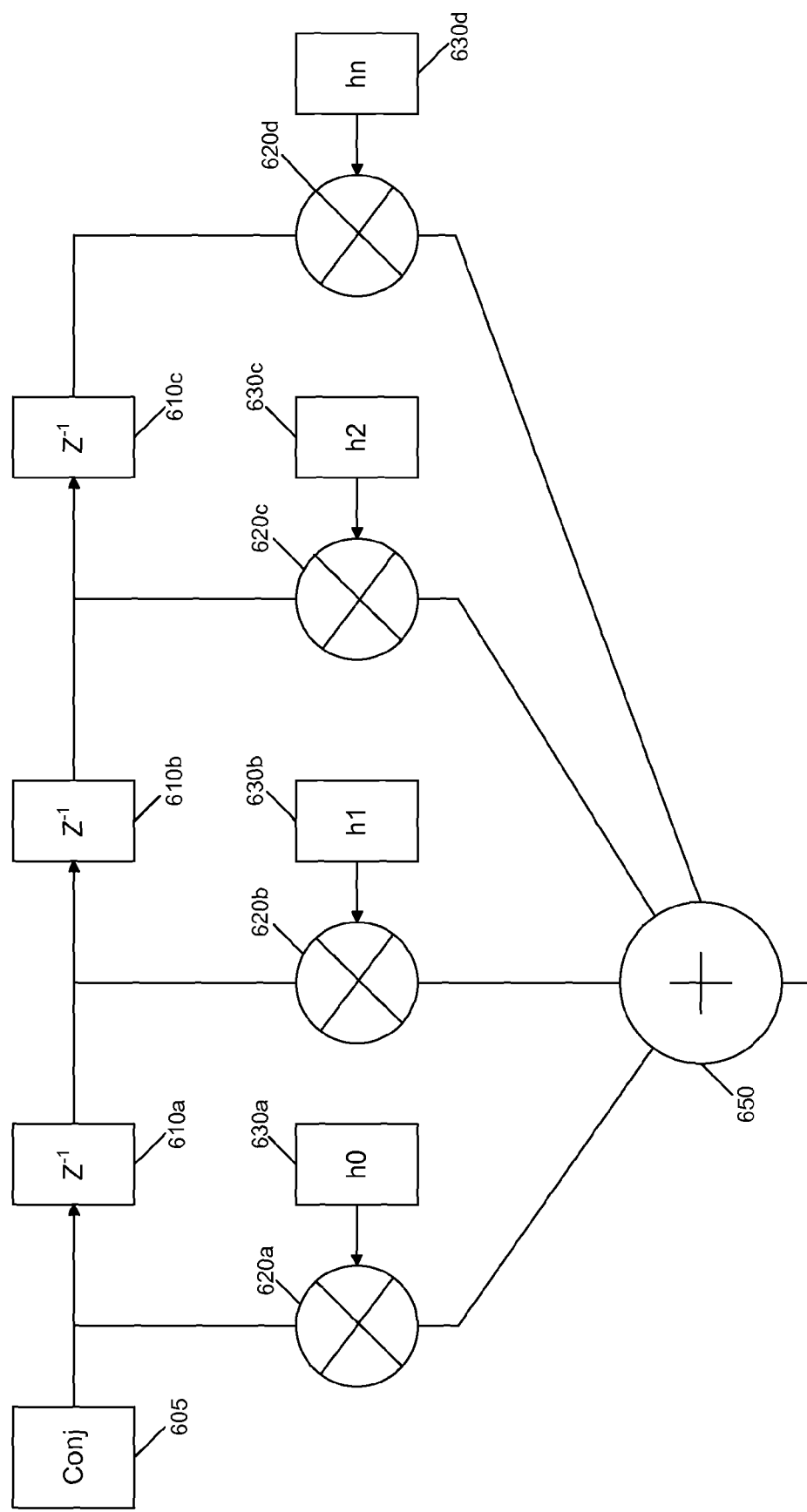
FIG. 8 is a block diagram of a digital filter in accordance with an embodiment of the present invention.

Now referring to FIG. 8, shown is a representation of a digital filter 600 in accordance with an embodiment of the present invention, and which may correspond to one of the signal and image filters 245$_a$ and 245$_b$ of FIG. 2. As shown in FIG. 8, a 4-tap filter is presented including delay elements 610$_a$-610$_c$. These delay elements are coupled in series, the first of which is to receive a value generated by a complex conjugate function 605 (such as function 240 of FIG. 2). The delayed output from each of delay elements 610, which may be registers, are provided to a respective multiplier 620$_a$-620$_d$, where the values are multiplied by a corresponding filter coefficient 630$_a$-630$_d$. In turn, all the products are combined in an adder 650, the output of which provides the filter output. With reference back to FIG. 7, the adaptive tap updates provided by circuit 500 may be provided to update the filter coefficients 630$_a$-630$_d$. While shown as a complex finite impulse response (FIR) filter, other implementations may use a different type of filter to generate filter outputs for the signal channel path and the image channel path.

Figure 9:
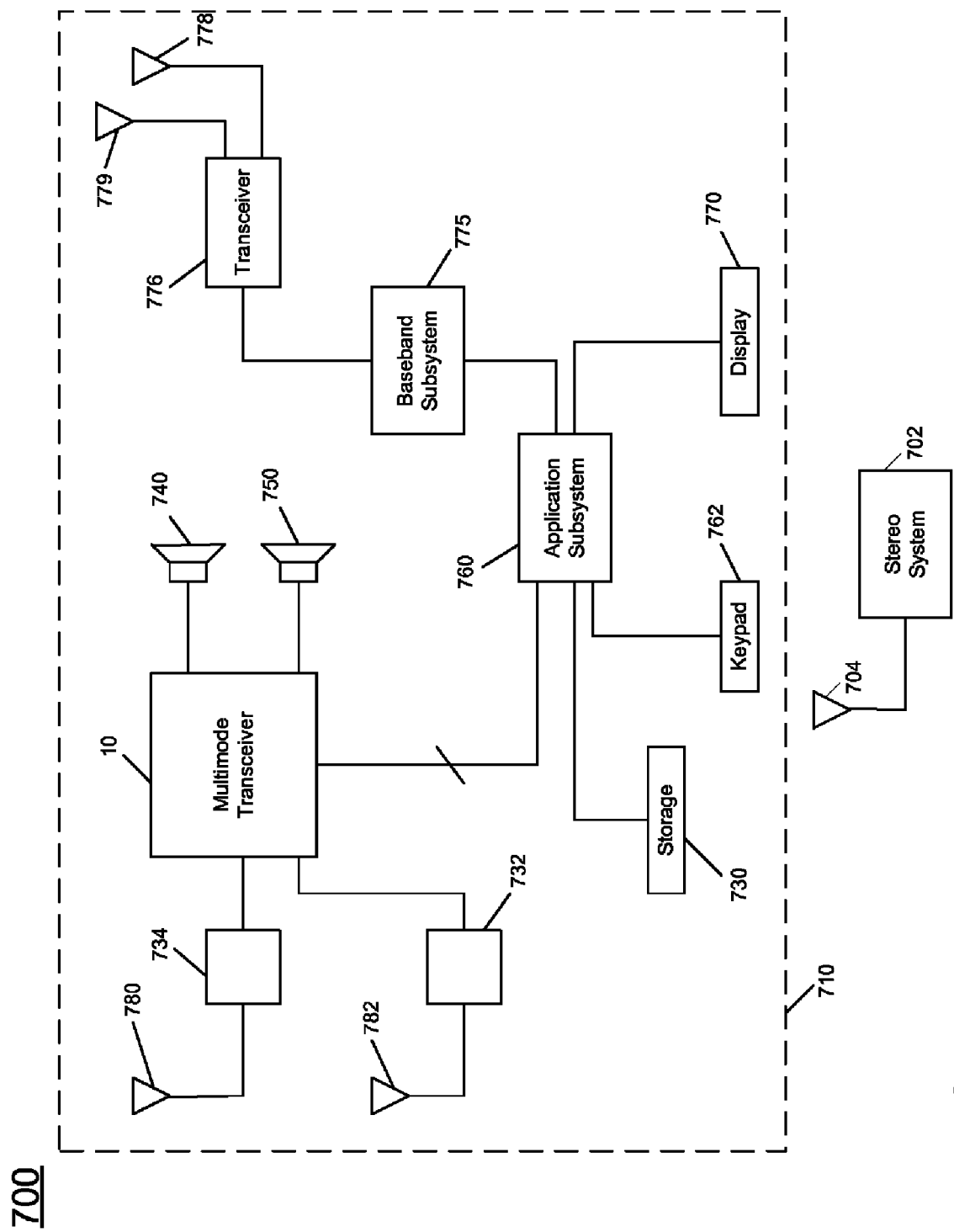
FIG. 9 is a block diagram of a system in accordance with an embodiment of the present invention.

Referring to FIG. 9, in accordance with some embodiments of the invention, a multimode transceiver 10, which may be receiver 10 of FIG. 1, may be part of a multimedia portable wireless device 710, which, in turn, is part of a wireless system 700. As examples, the wireless device 710 may be a multi-function, multi-band radio, a cellular telephone or PDA with the capability of playing music downloads, part of a wireless link between a satellite antenna and a radio receiver, a terrestrial receiver, etc.

Among its other various functions, the wireless device 710 may store digital content on a storage 730, which may be a flash memory or hard disk drive, as a few examples. The wireless device 710 generally includes an application subsystem 760 that may, for example, receive input from a keypad 762 of the wireless device 710 and display information, such as weather-related information obtained from a SAME message, on a display 770. Furthermore, the application subsystem 760 may generally control the retrieval and storage of content from the storage 730 and the communication of, e.g., audio with the multimode transceiver 10. As shown, the multimode transceiver 10 may be directly connected to speakers 740 and 750 for output of audio data. As depicted in FIG. 9, the multimode transceiver 10 may be coupled by a matching network 734 to a receiver antenna 780 and may be coupled by a matching network 732 to the transmit antenna 782.

Although the wireless device 710 may include the speakers 740 and 750, it may be desirable to play sounds that are generated by the wireless device 710 over a more sophisticated speaker system. Therefore, in accordance with some embodiments of the invention, the wireless device 710, via the multimode transceiver 10, may broadcast content to be played over an FM channel to the receiver of an adjacent stereo system 702 (as an example). As shown, the stereo system 702 includes an RF antenna 704 for purposes of receiving the transmitted content from the wireless device 710.

In accordance with some embodiments of the invention, the wireless device 710 may have the ability to communicate over a communications network, such as a cellular network. For these embodiments, the wireless device 710 may include a baseband subsystem 775 that is coupled to the application subsystem 760 for purposes of encoding and decoding baseband signals for this wireless network. Baseband subsystem 770 may be coupled to a transceiver 776 that is connected to corresponding transmit and receive antennas 777 and 778.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a signal channel path including:
      a first mixer to receive an intermediate frequency (IF) signal and to downconvert the IF signal to a signal channel baseband signal;
      a signal filter to receive a value of the signal channel baseband signal and to generate a filtered signal channel value;
      a first combiner to combine the signal channel baseband signal with a filtered image channel value to obtain a signal channel path output;
   an image channel path including:
      a second mixer to receive the IF signal and to downconvert the IF signal to an image channel baseband signal;
      an image filter to receive a value of the image channel baseband signal and to generate the filtered image channel value;
      a second combiner to combine the image channel baseband signal with the filtered signal channel value to obtain an image channel path output;
      a first controller to determine a signal strength of the signal channel baseband signal and the image channel baseband signal and to generate a step control signal based at least in part on the signal strengths; and
      a second controller to receive the signal channel path output and the image channel path output and to update a weighting of the image filter and the signal filter based on the signal channel path output, the image channel path output and the step control signal.

2. The apparatus of claim 1, wherein the signal channel path further includes a first programmable decimator coupled to the first mixer to receive the signal channel baseband signal and to output the signal channel baseband signal at a selected sample rate.

3. The apparatus of claim 2, wherein the first programmable decimator is controllable to output the signal channel baseband signal at the selected sample rate based on a selected radio band of operation.

4. The apparatus of claim 1, wherein the first controller is to determine whether to enable image cancellation via the image filter based on a difference between the signal strength of the signal channel baseband signal and the image channel baseband signal.

5. The apparatus of claim 4, wherein the first controller is to generate the step control signal with a first value during an acquisition mode and with a second value during a tracking mode.

6. The apparatus of claim 4, wherein the first controller is to generate the step control signal based on a comparison of the difference between the signal strengths of the signal channel baseband signal and the image channel baseband signal and a second difference between signal strengths of the signal channel path output and the image channel path output.

7. The apparatus of claim 1, wherein the second controller is to generate a cross-correlation value of the signal channel path output and the image channel path output, obtain a product of the cross-correlation value and the step control signal, and obtain a sum of the product and a value of a delay element of the image filter and to update a tap of the image filter with the sum.

8. The apparatus of claim 7, wherein the cross-correlation value is a mean value for a data block, and wherein the second controller is to calculate a cross-correlation between the signal channel path output and the image channel path output for only a predetermined number of samples of the data block.

9. The apparatus of claim 1, wherein the apparatus comprises a digital circuit to receive the IF signal as a digital complex signal and to provide the signal channel path output to a digital signal processor to perform demodulation of the signal channel path output to output audio information.

10. A system comprising:
    an antenna to receive a radio frequency (RF) signal;
    an analog front end to receive the RF signal from the antenna and to downconvert the RF signal to an intermediate frequency (IF) signal and to convert the IF signal to a digital complex signal;
    a digital front end coupled to the analog front end, the digital front end including an image canceller to perform image rejection, the image canceller including:
       an image channel path, the image channel path parallel to a signal channel path and including:
          a mixer to receive the digital complex signal, and to downconvert the digital complex signal to an image channel baseband signal;
          an image filter to receive a value of the image channel baseband signal and to generate a filtered image channel value;
          a combiner to combine the image channel baseband signal with a filtered signal channel value from the signal channel path to obtain an image channel path output;
       a first controller to determine a signal strength of a signal channel baseband signal and the image channel baseband signal and to generate a step control signal based at least in part on the signal strengths; and
       a second controller to receive a signal channel path output and the image channel path output and to update a weighting of the image filter based on the signal channel path output, the image channel path output and the step control signal; and
    a digital signal processor coupled to the digital front end to receive and demodulate the signal channel path output.

11. The system of claim 10, wherein the first controller is to determine whether to enable image cancellation via the image canceller, based on a difference between the signal strengths of the image channel baseband signal and the signal channel baseband signal.

12. The system of claim 11, wherein the image filter comprises a multi-tap complex filter including a plurality of delay elements each having an output coupled to a first input of a corresponding multiplier, each said multiplier having a second input coupled to receive a coefficient value from a corresponding coefficient element, wherein each said coefficient element is updatable by the second controller.

13. The system of claim 12, wherein the second controller is to update each said coefficient element using a sum value, the sum value obtained via a value of the corresponding coefficient element and a product of a cross-correlation value of the signal channel path output and the image channel path output and the step control signal.

14. The system of claim 11, wherein the first controller is to generate the step control signal with a first value during an acquisition mode and with a second value during a tracking mode.

15. The system of claim 10, wherein the image canceller further includes a first low pass filter to filter the image channel baseband signal and a second low pass filter to filter the image channel path output.

* * * * *